United States Patent [19]

Conover

[11] 4,274,189

[45] Jun. 23, 1981

[54] PILOT BEARING PULLER

[76] Inventor: Louis M. Conover, 808 S. St. Joseph Ave., Hastings, Nebr. 68901

[21] Appl. No.: 150,928

[22] Filed: May 19, 1980

[51] Int. Cl.[3] .............................................. B23P 19/04

[52] U.S. Cl. .......................................... 29/256; 29/261

[58] Field of Search ................. 29/256, 260, 261, 244, 29/282, 234

[56] References Cited

U.S. PATENT DOCUMENTS

| | | | |
|---|---|---|---|
| 1,131,868 | 3/1915 | Ridlon | 29/261 |
| 2,113,755 | 4/1938 | Billington | 29/256 |
| 2,607,110 | 8/1952 | Labounsky | 29/256 X |
| 3,402,455 | 9/1968 | Converse | 29/261 |
| 3,964,149 | 6/1976 | Hugh | 29/261 |

*Primary Examiner*—Robert C. Watson

*Attorney, Agent, or Firm*—Zarley, McKee, Thomte, Voorhees & Sease

[57] ABSTRACT

An apparatus is described for pulling the pilot bearing from a flywheel or the like comprising a support member having a pair of spaced-apart bolt members threadably mounted therein. The support member has a central opening formed therein between the bolt members which receives a pair of pivotally mounted first and second jaw members having bearing engaging portions at one end thereof. The jaw members are extended through the central opening in the pilot bearing and then locked into position by means of a smaller bolt extending through the jaw members to limit the pivotal movement thereof. Threadable rotation of the first and second bolt members causes the jaw members to pull the pilot bearing from the flywheel.

5 Claims, 5 Drawing Figures

PILOT BEARING PULLER

BACKGROUND OF THE INVENTION

This invention relates to a bearing puller and more particularly to a pilot bearing puller.

Many types of bearing pullers have been previously described but the vast majority of the same are extremely large and rather difficult to use. The presently available bearing pullers may not be conveniently used to pull the pilot bearings from a flywheel or the like due to the size and construction thereof.

Therefore, it is a principal object of the invention to provide an improved pilot bearing puller.

A still further object of the invention is to provide a pilot bearing puller which may be used to pull the pilot bearing from a flywheel without removing the flywheel from the engine.

A still further object of the invention is to provide a pilot bearing puller including means for locking a pair of jaw members into position.

A still further object of the invention is to provide a pilot bearing puller which may be used to pull different sized bearings from flywheels or the like.

A still further object of the invention is to provide a pilot bearing puller which is economical of manufacture, durable in use and convenient to use.

These and other objects will be apparent to those skilled in the art.

SUMMARY OF THE INVENTION

An apparatus is disclosed for pulling the pilot bearing from a diesel engine flywheel or the like which is not only convenient to use but which may be used to pull the pilot bearing without removing the flywheel from the engine. A flat plate is provided with a central opening positioned between a pair of threadably mounted bolt members extending therethrough. A pair of pivotal jaw members are pivotally mounted on the support within the central opening and are adapted to grasp the interior portion of the bearing. Threadable rotation of the bolt members causes the pilot bearing to be pulled from the flywheel.

DESCRIPTION OF THE PREFERRED EMBODIMENT

Figure 1:
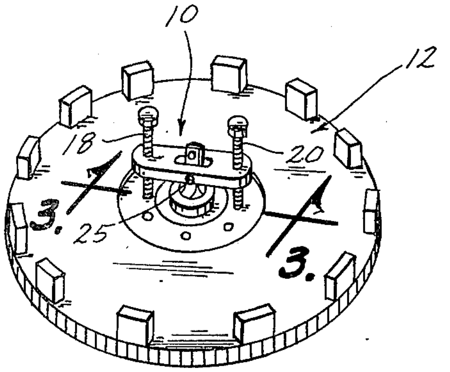
FIG. 1 is a perspective view illustrating the pilot bearing puller of this invention being used to pull the pilot bearing from a flywheel.
Figure 3:
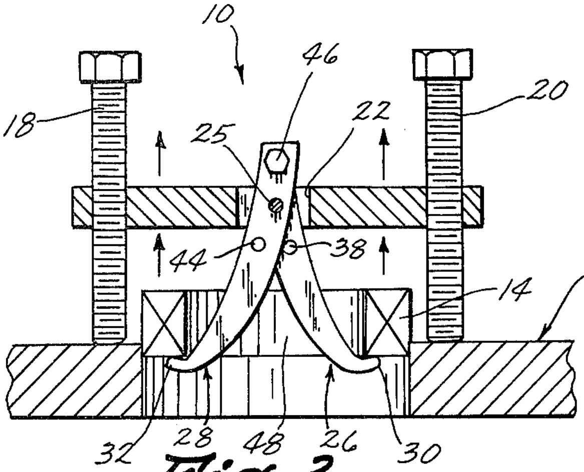
FIG. 3 is an enlarged sectional view as seen on the section lines of FIG. 1.
Figure 4:
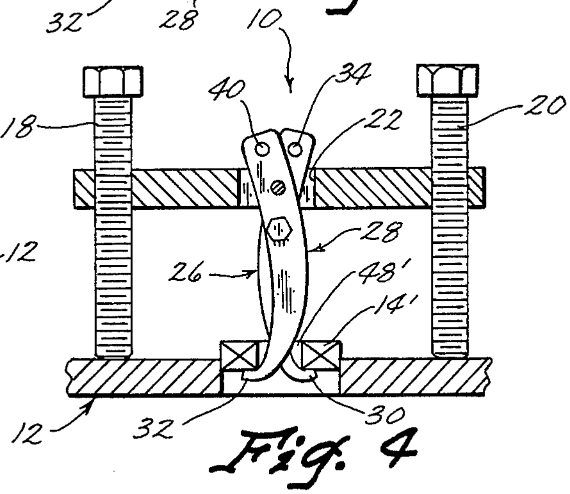
FIG. 4 is a sectional view similar to FIG. 3 except that the apparatus is being used to pull a smaller bearing from a flywheel.

The apparatus of this invention is referred to generally by the reference numeral 10 while the reference numeral 12 refers to a flywheel commonly associated with a diesel engine or the like. FIGS. 1 and 3 illustrate that the flywheel 12 has a pilot bearing 14 mounted therein. FIG. 4 illustrates a flywheel 12' having a pilot bearing 14' mounted therein. It can be seen from a comparison of FIGS. 3 and 4 that the pilot bearing 14 is larger than the pilot bearing 14' and that the apparatus 10 may be used to pull bearings of different sizes from the flywheel.

Figure 2:
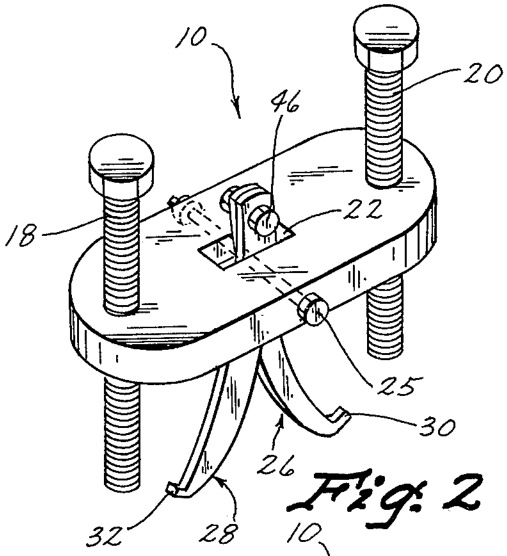
FIG. 2 is a perspective view of the apparatus of this invention.
Figure 5:
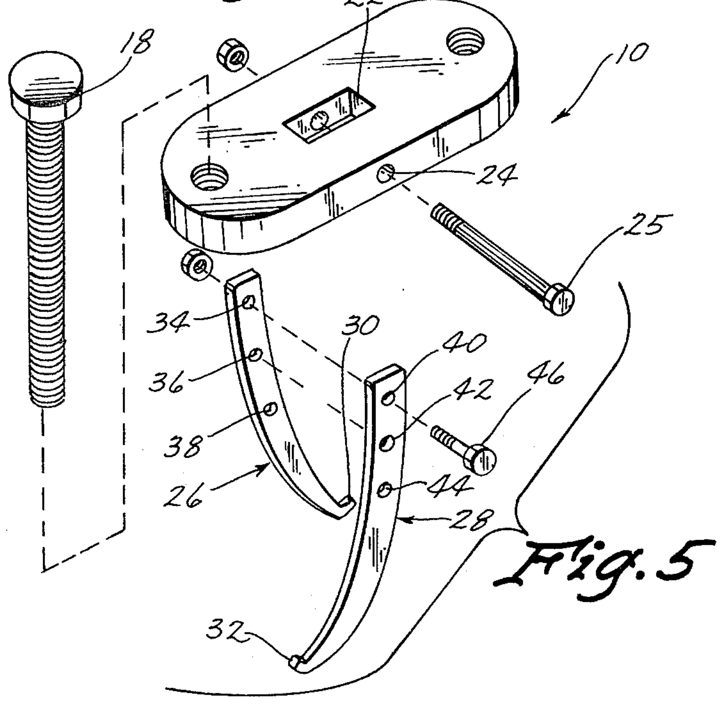
FIG. 5 is an exploded perspective view of the pilot bearing puller of this invention.

Apparatus 10 generally includes a flat support plate 16 having a pair of bolt members 18 and 20 threadably mounted therein as best seen in FIG. 2. Support plate 16 is provided with a central opening 22 which is positioned between the bolt members 18 and 20. Support plate 16 is also provided with an opening 24 extending therethrough which communicates with the central opening 22 as best illustrated in FIG. 5.

The numerals 26 and 28 refer to a pair of elongated and arcuate jaw members having bearing gripping portions 30 and 32 at one end thereof respectively. Jaw member 26 is provided with spaced-apart openings 34, 36 and 38 while jaw member 28 is provided with spaced-apart openings 40, 42 and 44. The numeral 46 refers to a bolt which is adapted to be extended through either of the openings 34–40 or 38–44 as will be described in more detail hereinafter.

The apparatus 10 may be used to pull the pilot bearing 14 from the flywheel 12 without the necessity of removing the flywheel 12 from the diesel engine. The bolt member 25 is initially extended through the opening 24 and through the openings 36–42 of the jaw members 26 and 28. The jaw members 26 and 28 are then pivotally moved relative to the support 16 so that they are substantially parallel to permit the jaw members to be inserted through the central opening 48 of the bearing 14. When the bearing engaging portions 30 and 32 have been extended through the central opening 48, the jaw members 26 and 28 are pivotally moved outwardly to the position illustrated in FIG. 3. Bolt member 46 is then extended through the openings 34 and 40 to lock the jaw members 26 and 28 into the position illustrated in FIG. 3. Threadable rotation of the bolt members 18 and 20 causes the jaw members 26 and 28 to pull the bearing 14 from the flywheel 12 as illustrated in FIG. 3. When the bearing 14 has been removed from the flywheel 12, the bolt 46 is removed from the jaw members 26 and 28 to permit the removal of the bearing 14 from the apparatus 10.

The apparatus 10 may also be used to remove a pilot bearing 14' which has a substantially smaller central opening 48' as illustrated in FIG. 4. When such a smaller bearing is being removed from the flywheel 12', the bolt member 46 is extended through the openings 38 and 40 of jaw members 26 and 28 respectively.

Thus it can be seen that a novel pilot bearing puller has been described which may be conveniently used to remove a pilot bearing from a flywheel or the like without the necessity of removing the flywheel from the engine. The apparatus herein described is easily adaptable for use with bearings of different sizes and the positioning of the bolts 18 and 20 on opposite sides of the pilot bearing permits even pulling forces to be applied to the bearing will be removed from the flywheel without damaging the flywheel.

Thus it can be seen that the apparatus of this invention accomplishes at least all of its stated objectives.

I claim:

1. An apparatus for pulling a bearing from a flywheel or the like, comprising, a support means, a pair of spaced-apart bolt members threadably mounted in said support means, said support means having a central opening formed therein between said bolt members, first and second jaw members pivotally mounted on said support means within said central opening and extending therefrom for engagement with the inner diameter of the bearing, one end of each of said bolt members being adapted to be placed in engagement with the flywheel on opposite sides of the bearing whereby said jaw members will pull the bearing from the flywheel when said bolt members are threadably rotated in one direction relative to said support means, each of said jaw members having spaced-apart first, second and third openings formed therein and wherein a third bolt member extends through said support means and the said second openings in said jaw members, and a fourth bolt member extending through the said first openings in said jaw members to limit the pivotal movement thereof.

2. An apparatus for pulling a bearing from a flywheel or the like, comprising, a support means, a pair of spaced-apart bolt members threadably mounted in said support means, said support means having a central opening formed therein between said bolt members, first and second jaw members pivotally mounted on said support means within said central opening and extending therefrom for engagement with the inner diameter of the bearing, one end of each of said bolt members being adapted to be placed in engagement with the flywheel on opposite sides of the bearing whereby said jaw members will pull the bearing from the flywheel when said bolt members are threadably rotated in one direction relative to said support means, each of said jaw members having spaced-apart first, second and third openings formed therein and wherein a third bolt member extends through said support means and the said second openings in said jaw members, and a fourth bolt member extending through the said third openings in said jaw members to limit the pivotal movement thereof.

3. An apparatus for pulling a bearing from a flywheel or the like, comprising, a support means, a pair of spaced-apart bolt members threadably mounted in said support means, said support means having a central opening formed therein between said bolt members, first and second jaw members pivotally mounted on said support means within said central opening and extending therefrom for engagement with the inner diameter of the bearing, one end of each of said bolt members being adapted to be placed in engagement with the flywheel on opposite sides of the bearing whereby said jaw members will pull the bearing from the flywheel when said bolt members are threadably rotated in one direction relative to said support means, each of said jaw members having spaced-apart first. second and third openings formed therein and wherein a third bolt member extends through said support means and the said second openings in said jaw members, and a fourth bolt member extending through one of the said pair of first openings or the said pair of third openings to limit the pivotal movement of said jaw members.

4. An apparatus for pulling a bearing from a flywheel or the like, comprising, a support means, a pair of spaced-apart bolt members threadably mounted in said support means, said support means having a central opening formed therein between said bolt members, first and second jaw members pivotally mounted on said support means within said central opening and extending therefrom for engagement with the inner diameter of the bearing, one end of each of said bolt members being adapted to be placed in engagement with the flywheel on opposite sides of the bearing whereby said jaw members will pull the bearing from the flywheel when said bolt members are threadably rotated in one direction relative to said support means, a third bolt member extending through said support means and said jaw members to provide the pivotal connection therebetween, each of said jaw members having at least spaced-apart first and second openings formed therein, said third bolt member extending through said first openings and a fourth bolt member extending through said second openings to limit the pivotal movement of said jaw members.

5. An apparatus for pulling a bearing from a flywheel or the like, comprising, a flat support means having opposite ends and opposite sides, a pair of spaced-apart bolt members threadably mounted in said support means adjacent the opposite ends thereof extending transversely to the plane of said support means, said support means having a central opening formed therein between said bolt members, first and second jaw members pivotally mounted on said support means within said central opening and extending therefrom for engagement with the inner diameter of the bearing, each of said jaw members being elongated and having an arcuate curved length with outwardly extending bearing engaging portions so that the jaw member may extend through the inner diameter of the bearing and so that the bearing engaging portion may engage one side of the bearing, one end of each of said bolt members being adapted to be placed in engagement with the flywheel on opposite sides of the bearing whereby said jaw members will pull the bearing from the flywheel when said bolt members are threadably rotated in one direction relative to said support means.

* * * * *